(12) United States Patent (10) Patent No.: US 12,671,775 B2
Sasaki et al. (45) Date of Patent: Jun. 30, 2026

(54) IMAGE READING APPARATUS

(71) Applicants: Hironori Sasaki, Kanagawa (JP);
Atsuki Nishigo, Tokyo (JP)

(72) Inventors: Hironori Sasaki, Kanagawa (JP);
Atsuki Nishigo, Tokyo (JP)

(73) Assignee: Ricoh Company, Ltd., Tokyo (JP)

( * ) Notice: Subject to any disclaimer, the term of this
patent is extended or adjusted under 35
U.S.C. 154(b) by 273 days.

(21) Appl. No.: 18/648,257

(22) Filed: Apr. 26, 2024

(65) Prior Publication Data

US 2024/0388671 A1 Nov. 21, 2024

(30) Foreign Application Priority Data

May 16, 2023 (JP) ................................. 2023-081120

(51) Int. Cl.
*H04N 1/32* (2006.01)
*H04N 1/00* (2006.01)
*H04N 1/40* (2006.01)

(52) U.S. Cl.
CPC ..... *H04N 1/32646* (2013.01); *H04N 1/00029*
(2013.01); *H04N 1/40068* (2013.01)

(58) Field of Classification Search
None
See application file for complete search history.

(56) References Cited

U.S. PATENT DOCUMENTS

| | | | | | |
|---|---|---|---|---|---|
| 9,525,800 | B2 * | 12/2016 | Horiguchi | ............ | H04N 1/4076 |
| 2005/0068552 | A1 * | 3/2005 | Kimura | .................. | H04N 1/401 |
| | | | | | 358/1.9 |
| 2008/0137156 | A1 * | 6/2008 | Ono | ................... | H04N 1/00236 |
| | | | | | 358/486 |
| 2009/0086247 | A1 * | 4/2009 | Kikuchi | ............ | H04N 1/00002 |
| | | | | | 358/1.13 |

(Continued)

FOREIGN PATENT DOCUMENTS

| | | |
|---|---|---|
| JP | 11-284848 A | 10/1999 |
| JP | 2002-044437 A | 2/2002 |

(Continued)

OTHER PUBLICATIONS

Tatsui Yoshiaki, JP-2019134351-A English Translation (Year: 2019).*

*Primary Examiner* — Miya J Cato
(74) *Attorney, Agent, or Firm* — Duft & Bornsen, PC

(57) ABSTRACT

An image reading apparatus includes a first white memory,
a second white memory, an image reading device to acquire
an image data with a resolution mode, circuitry to process
signals of the image data, determine whether the image data
is one of first white shading data as a reference, the first
white shading data or the image data acquired from an
original document read by the image reading device, tem-
porarily store the first white shading data in the first white
memory, stores the first white shading data stored in the first
white memory in the second white memory, converts a
resolution of the first white shading data stored in the second
white memory according to a resolution of the image data to (Continued)

create second white shading data, stores the second white shading data in the first white memory, and correct the image data by the second white shading data.

6 Claims, 6 Drawing Sheets

(56)                    References Cited

U.S. PATENT DOCUMENTS

2010/0302605 A1* 12/2010 Suzuki .................. H04N 1/401
                                                              358/474
2021/0400166 A1   12/2021 Nishigo
2023/0336666 A1   10/2023 Hironori et al.

FOREIGN PATENT DOCUMENTS

| JP | 2005-033457 A |   | 2/2005  |
| JP | 2005-354192 A |   | 12/2005 |
| JP | 2019134351 A  | * | 8/2019  |

* cited by examiner

FIG. 1

IMAGE READING APPARATUS

CROSS-REFERENCE TO RELATED APPLICATIONS

This patent application is based on and claims priority pursuant to 35 U.S.C. § 119 (a) to Japanese Patent Application No. 2023-081120, filed on May 16, 2023, in the Japan Patent Office, the entire disclosure of which is hereby incorporated by reference herein.

BACKGROUND

Technical Field

Embodiments of the present disclosure relate to an image reading apparatus.

Related Art

In an image reading apparatus that scans an image in an image reading device, a linear sensor using a complementary metal oxide semiconductor (CMOS) sensor is mainly used as the image reading device. In such an image reading device, a read image affected by the specific features and surrounding environment of the CMOS sensor is obtained.

In order to eliminate such features, the image reading apparatus typically corrects the read image using white shading data prepared in advance for correction. When the resolution of the image reading apparatus in the main scanning direction is changed, the number of pixels is changed. Accordingly, it is needed to acquire white shading data for correction at each time or to prepare a memory that stores the white shading data for correction at each resolution. As a problem, the former takes a long time to read an image, and the latter increases the cost due to a shortage of memory.

SUMMARY

According to an embodiment of the present disclosure, an image reading apparatus includes a first white memory, a second white memory including a nonvolatile memory, an image reading device having multiple resolution modes to acquire an image data with a resolution mode of one of the multiple resolution modes, circuitry to process signals of the image data, determine whether the image data is one of first white shading data as a reference, the first white shading data having a number of resolution modes smaller than a number of the multiple resolution modes of the image reading device or the image data acquired from an original document read by the image reading device, temporarily store the first white shading data in the first white memory, stores the first white shading data stored in the first white memory in the second white memory, converts a resolution of the first white shading data stored in the second white memory according to a resolution of the image data to create second white shading data, stores the second white shading data in the first white memory, and correct the image data by the second white shading data.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 1 is a block diagram illustrating a configuration of an image reading apparatus according to a first embodiment of the present disclosure;

Figure 2:
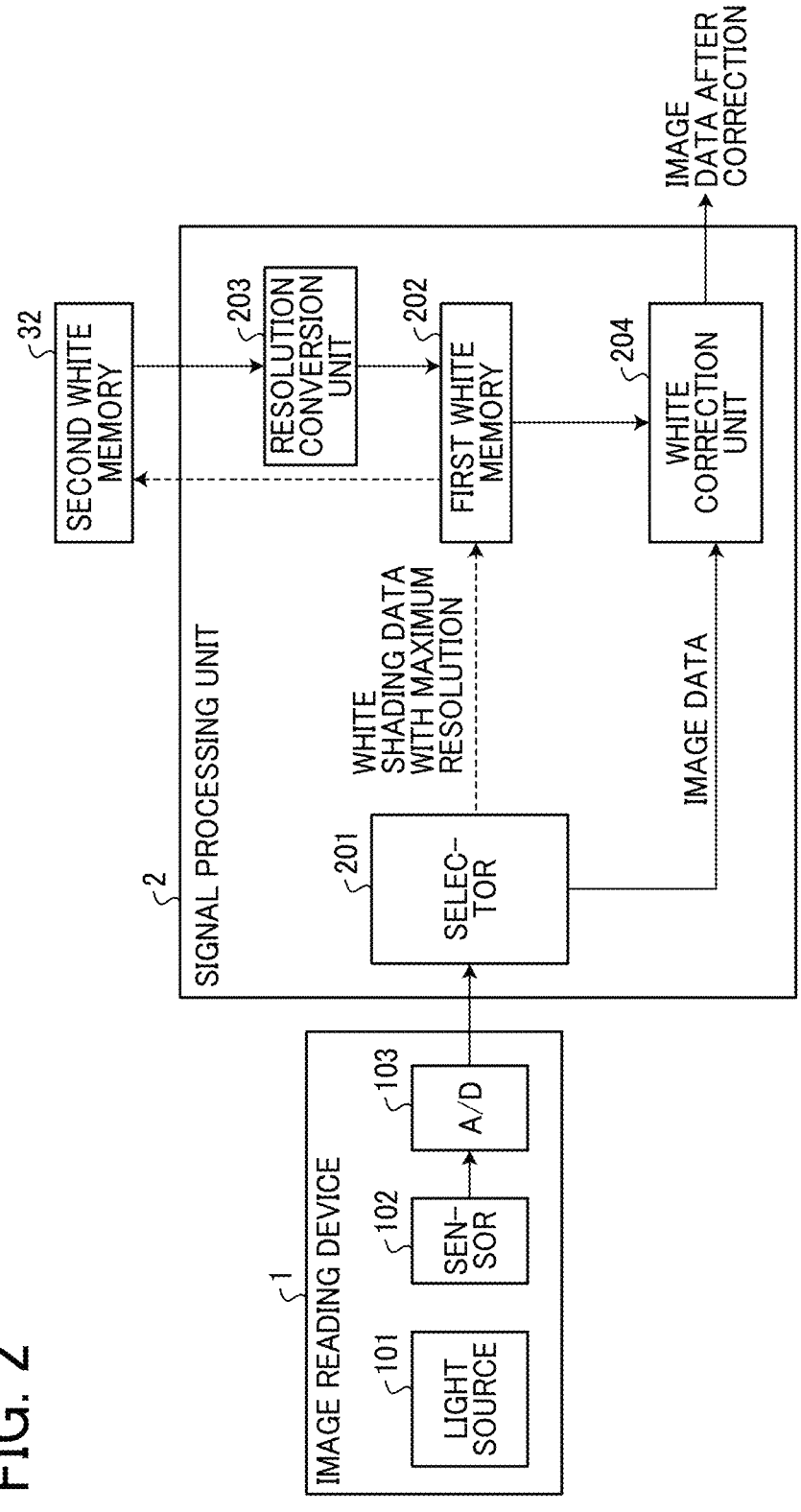
FIG. 2 is a block diagram illustrating a configuration of an image reading apparatus according to a second embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

According to an embodiment of the present disclosure, an image reading apparatus that can increase an image quality while maintaining a reading time.

Embodiments of an image reading apparatus will be described in detail with reference to the accompanying drawings.

First Embodiment

Figure 1:
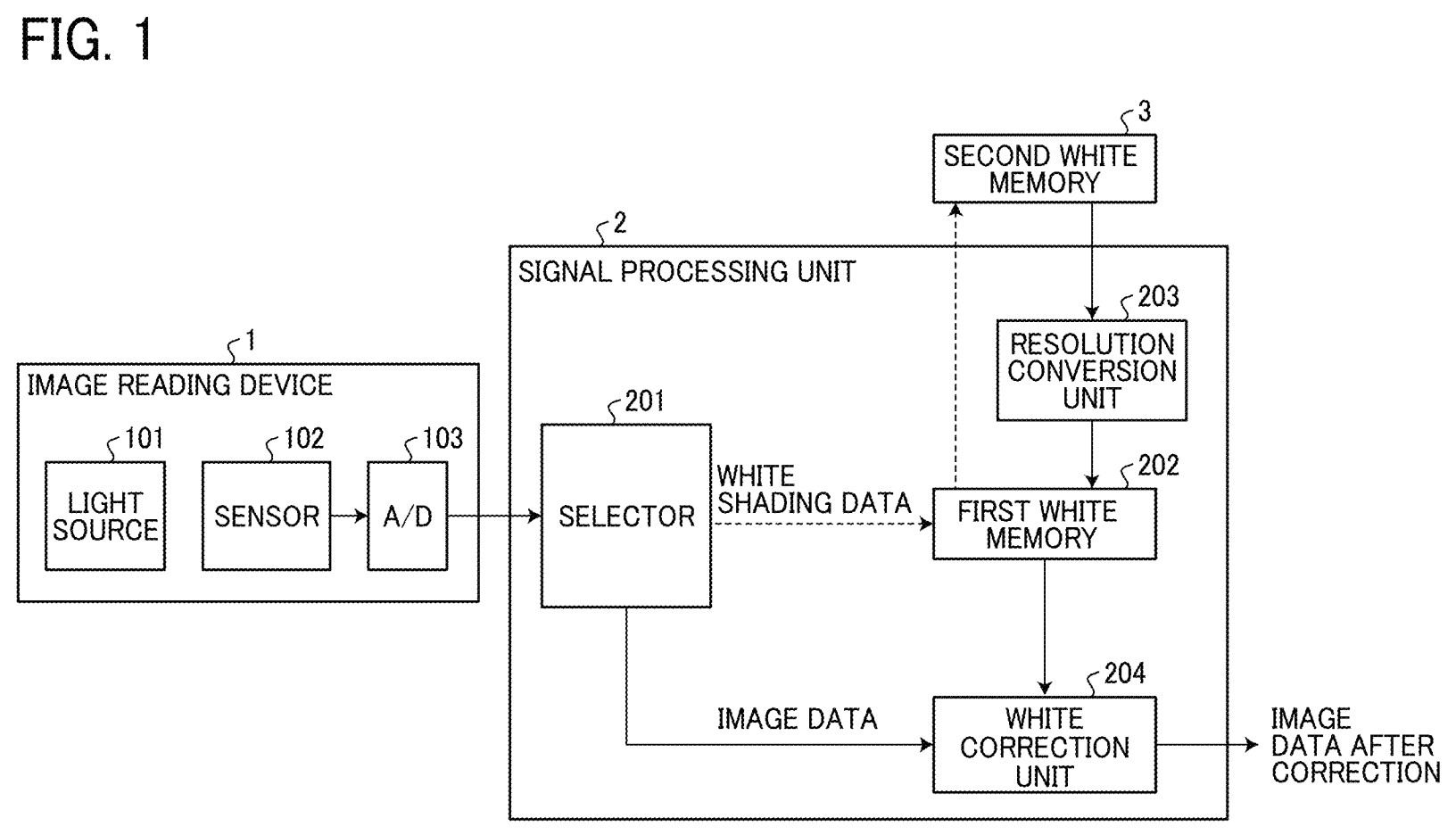

FIG. 1 is a block diagram illustrating a configuration of an image reading apparatus according to a first embodiment of the present disclosure. As illustrated in FIG. 1, the image reading apparatus according to the first embodiment includes an image reading device 1, a signal processing unit 2, and a second white memory unit 3.

For example, the image reading device 1 includes multiple resolution modes having different resolutions in a main scanning direction and acquires image data by reading an original document with a resolution mode of the multiple resolution modes. Specifically, the image reading device 1 includes a light source 101, a sensor 102, and an analog-digital (A/D) converter 103. The A/D converter 103 converts analog data acquired by the sensor 102 into digital data and sends the digital data to the signal processing unit 2.

Specifically, the sensor 102 may be a contact image sensor (CIS) using a CMOS sensor, or may be a charge coupled device (CCD) sensor.

For example, the signal processing unit 2 processes image data acquired by the image reading device 1 with signal processing. Specifically, the signal processing unit 2 includes a selector 201, a first white memory unit 202, a resolution conversion unit 203, and a white correction unit 204. For example, the selector 201 determines whether the image data acquired by the image reading device 1 is the white shading data that is a reference or the image data that has been read from an original document. In the case where the digital data to be input from the image reading device 1 is the white shading data, the selector 201 temporarily stores the white shading data in the first white memory unit 202, and in the case where the digital data to be input from the image reading device 1 is the image data, the selector 201 sends the image data to the white correction unit 204.

For example, the first white memory unit 202 temporarily stores white shading data for multiple resolution modes having different resolutions in the main scanning direction. The number of resolution modes of the white shading data is smaller than the number of resolution modes of the image reading device 1. The first white memory unit 202 temporarily stores the white shading data sent from the selector 201, and stores the white shading data in the second white memory unit 3. As described below, the first white memory unit 202 temporarily stores the white shading data whose resolution has been converted (i.e., resolution-converted white shading data) by the resolution conversion unit 203, and sends the resolution-converted white shading data to the white correction unit 204.

The resolution conversion unit 203 converts a resolution of the white shading data called from the second white memory unit 3 into another resolution (i.e., resolution-converted white shading data), and temporarily stores the resolution-converted white shading data in the first white memory unit 202. Specifically, the resolution conversion unit 203 converts a resolution of the white shading data stored in the second white memory unit 3 into another resolution (i.e., resolution-converted white shading data) depending on a resolution of image data to be acquired by the image reading device 1, and stores the resolution-converted white shading data in the first white memory unit 202. This resolution conversion is arithmetically performed, and there are three types of conversion, i.e., up conversion, down conversion, and non-conversion. The resolution becomes higher in the up conversion, the resolution becomes lower in the down conversion, and the resolution is not changed, and the data is sent as it is in the non-conversion.

The white correction unit 204 corrects the image data sent from the selector 201 using the white shading data (i.e., resolution-converted white shading data) sent from the first white memory unit 202, and outputs corrected image data that is image data after correction. In other words, the white correction unit 204 corrects image data acquired by the image reading device 1 using the white shading data (i.e., resolution-converted white shading data) that has been converted by the resolution conversion unit 203. The image data acquired by the image reading device 1 is affected by, for example, the features and surrounding environment of the sensor. Accordingly, even if an image having a uniform density is read, the image data is not uniform as viewed from the main scanning direction. However, the white correction unit 204 can output image data having a uniform density by correction.

The second white memory unit 3 is disposed outside the signal processing unit 2 as a configuration, is a nonvolatile memory, and holds data even when the power supply is stopped. At a required timing, the white shading data stored in the second white memory unit 3 is called and sent to the resolution conversion unit 203. In other words, the second white memory unit 3 includes a nonvolatile memory storing the white shading data of the first white memory unit 202. In the first embodiment of the present disclosure, the second white memory unit 3 is disposed outside the signal processing unit 2, but may be disposed inside the signal processing unit 2.

For example, the signal processing unit 2 acquires white shading data from the image reading device 1 in a process that can guarantee a product quality at a time of shipment from a factory, and stores the white image data in the second white memory unit 3 including a nonvolatile memory. When the white shading data is stored in the second white memory unit 3, the number of resolution modes of the white shading data in the main scanning direction may be a single mode or multiple modes as long as the number of resolution mode is smaller than the number of the resolution modes that the image reading device 1 has.

For example, the image reading device 1 has three resolution modes of 1200 dot per inch (dpi), 600 dpi, and 300 dpi, and the resolution mode of the white shading data to be stored in the second white memory unit 3 may be a single resolution mode of 1200 dpi, or two resolution modes of 1200 dpi and 300 dpi. After the image reading apparatus is put on the market, the white shading data to be stored in the second white memory unit 3 is not acquired again. In other words, the data transmission indicated by the dashed line in FIG. 1 is not used after the image reading apparatus is put on the market.

The resolution conversion unit 203 converts a resolution of the white shading data stored in the second white memory unit 3 such that the resolution of the white shading data and the resolution of the image data are the same, and the white correction unit 204 corrects the image data. For example, the image reading device 1 has three resolution modes of 1200 dpi, 600 dpi, and 300 dpi, and the second white memory unit 3 stores the white shading data with 1200 dpi and the white shading data with 600 dpi. In the case where the image data with 300 dpi is acquired, the resolution conversion unit 203 calls the white shading data with 600 dpi from the second white memory unit 3 and converts the white shading data with 600 dpi into the white shading data with 300 dpi. The white correction unit 204 corrects the image data using the white shading data with 300 dpi converted from the white shading data with 600 dpi. Alternatively, the resolution conversion unit 203 may call the white shading data with 1200 dpi from the second white memory unit 3 and convert the white shading data with 1200 dpi into the white shading data with 300 dpi.

As a result, faulty white shading data is not generated in the market, and there is no need to acquire the white shading data from the image reading device 1 at each time the resolution of the image reading device 1 changes. In the case where the image reading device 1 or the signal processing unit 2 is replaced in the market as a part replacement, the data quality of the white shading data can be constantly maintained by updating the white shading data stored in the second white memory unit 3 of a nonvolatile memory or replacing the second white memory unit 3. As a result, the image quality is increased while maintaining a reading time.

As described above, in the image reading apparatus according to the first embodiment, since the nonvolatile memory is used as the memory that stores the white shading data, the storing state of the white shading data can be maintained even when the power supply of the image reading apparatus is in an off state. Since the white shading data is used, the white shading data can be stored and used in advance not in the market but in the process that can maintain the data quality of the white shading data at the time of shipment from the factory. As a result, the image quality can be increased while maintaining the reading time.

In an embodiment of the preset disclosure, an image reading apparatus includes a first white memory, a second white memory, an image reading device to acquire an image data with a resolution mode, circuitry to process signals of the image data, determine whether the image data is one of first white shading data as a reference, the first white shading data or the image data acquired from an original document read by the image reading device, temporarily store the first white shading data in the first white memory, stores the first white shading data stored in the first white memory in the second white memory, converts a resolution of the first white shading data stored in the second white memory according to a resolution of the image data to create second white shading data, stores the second white shading data in the first white memory, and correct the image data by the second white shading data.

Second Embodiment

In a second embodiment of the present disclosure, the white shading data to be stored in the second white memory unit includes white shading data having the maximum resolution among the resolutions of multiple resolution modes included in the image reading device. In the following description, the description of the same or like configuration as that of the above-described embodiment is omitted.

FIG. 2 is a block diagram illustrating a configuration of an image reading apparatus according to a second embodiment of the present disclosure. In the second embodiment, only the white shading data with the maximum resolution among the resolutions of the multiple resolution modes of the image reading device 1 may be stored as the white shading data acquired from the image reading device 1 and stored in the second white memory unit 32.

For example, the image reading device 1 has three resolution modes of 1200 dpi, 600 dpi, and 300 dpi, and the resolution mode of the white shading data to be stored in the second white memory unit 32 is only a single resolution mode of 1200 dpi.

As described above, in the image reading apparatus according to the second embodiment of the present disclosure, since a resolution of the white shading data is converted into a lower resolution, the quality deterioration of the white shading data caused by the resolution conversion can be prevented.

In an embodiment of the preset disclosure, in the image reading apparatus, the circuitry further stores the first white shading data, having a maximum resolution mode among the multiple resolution modes, in the second white memory.

Third Embodiment

In a third embodiment of the present disclosure, the white shading data stored in the second white memory unit includes white shading data having the minimum resolution among the resolutions of the multiple resolution modes of the image reading device 1. In the following description, the description of the same or like configuration as that of the above-described embodiment is omitted.

Figure 3:
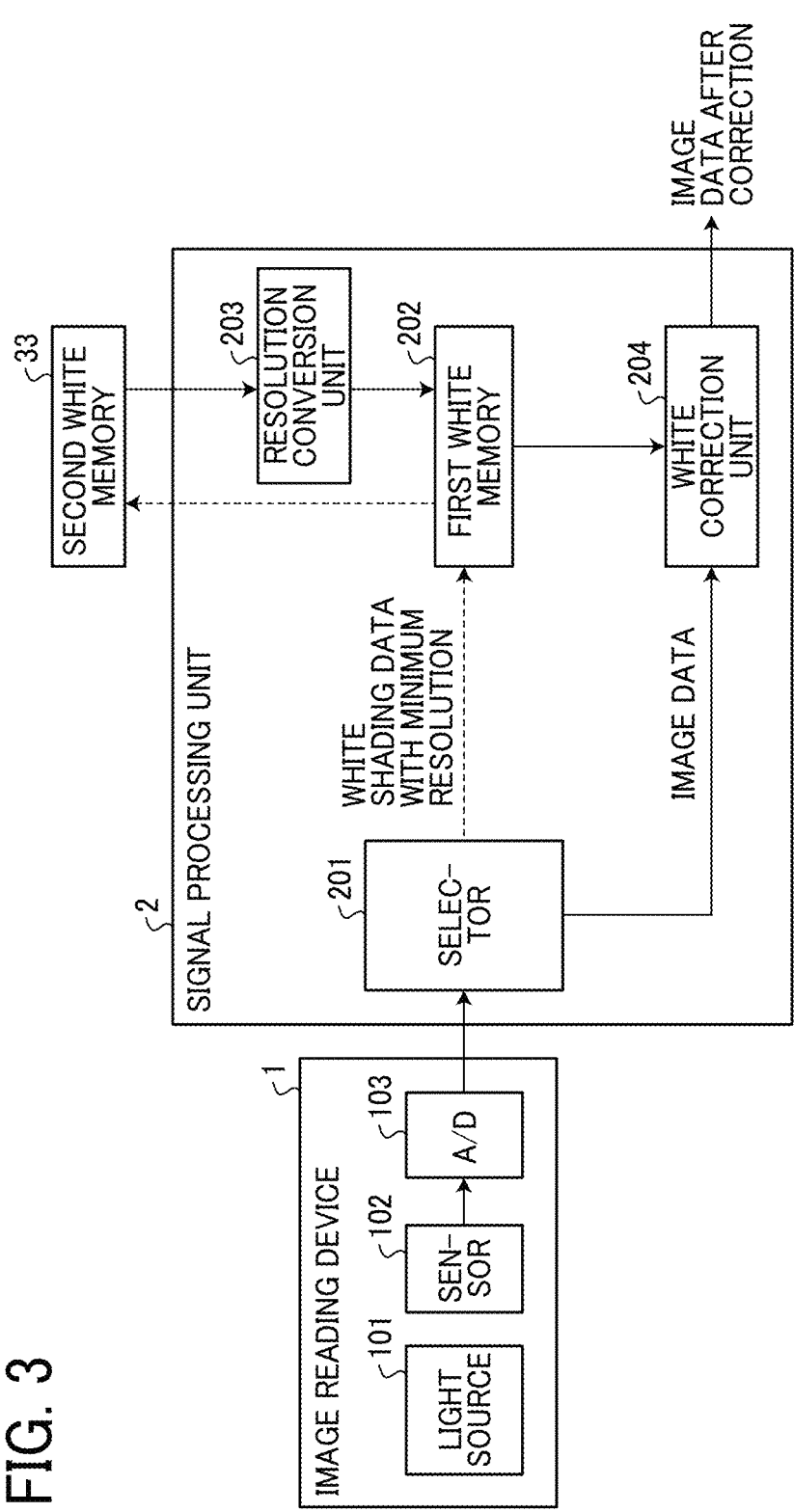
FIG. 3 is a block diagram illustrating a configuration of an image reading apparatus according to a third embodiment of the present disclosure.

FIG. 3 is a block diagram illustrating a configuration of an image reading apparatus according to a third embodiment of the present disclosure. The white shading data is acquired from the image reading device 1. In the third embodiment, the second white memory unit 33 may store only the white shading data having the minimum resolution among the resolutions of the multiple resolution modes of the image reading device 1.

For example, the image reading device 1 has three resolution modes of 1200 dpi, 600 dpi, and 300 dpi, and the resolution mode of the white shading data to be stored in the second white memory unit 33 is only a single resolution mode of 300 dpi.

As described above, in the image reading apparatus according to the third embodiment of the present disclosure, the amount of data stored in the second white memory unit 33 can be further reduced, and the cost can be reduced.

In an embodiment of the preset disclosure, in the image reading apparatus, the circuitry further stores the first white shading data, having a minimum resolution mode among the multiple resolution modes, in the second white memory.

Fourth Embodiment

In a fourth embodiment of the present disclosure, multiple resolution conversions are performed to white shading data having a single resolution to generate white shading data with multiple resolutions corresponding to multiple resolution modes of the image reading device 1 before the white shading data having the single resolution is stored in the second white memory unit from the first white memory unit. In the following description, the description of the same or like configuration as that of the above-described embodiment is omitted.

Figure 4:
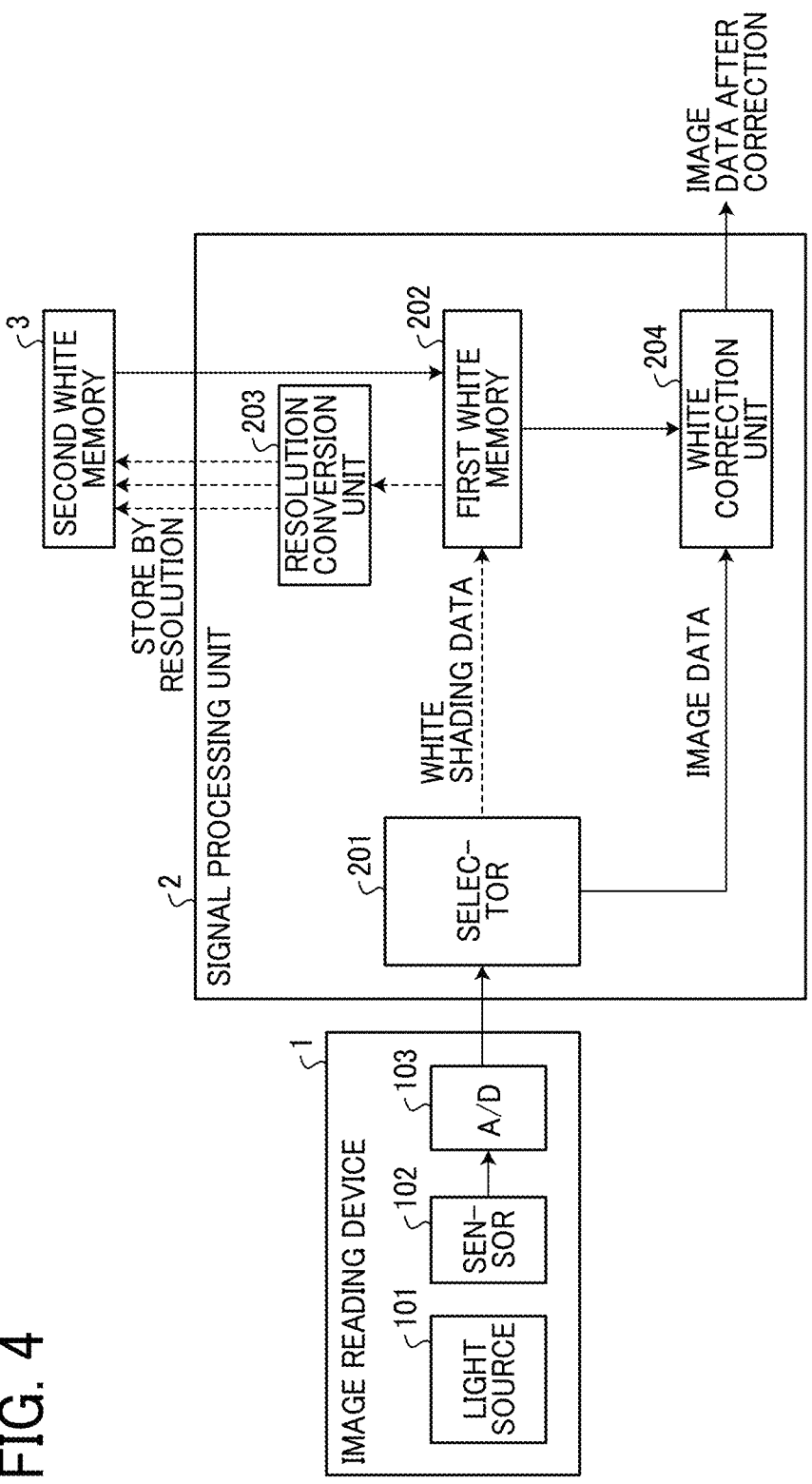
FIG. 4 is a block diagram illustrating a configuration of an image reading apparatus according to a fourth embodiment of the present disclosure.

FIG. 4 is a block diagram illustrating a configuration of an image reading apparatus according to the fourth embodiment of the present disclosure. In the fourth embodiment, the position of the resolution conversion unit 203 of the signal processing unit 2 is changed as compared with the configuration of the first embodiment. In the fourth embodiment, the resolution conversion unit 203 does not store the white shading data temporarily stored in the first white memory unit 202 into the second white memory unit 3 as it is. The resolution conversion unit 203 converts a single resolution of the white shading data into multiple resolutions corresponding to the resolution modes of the image reading device 1 in advance, and stores the white shading data having multiple resolutions in the second white memory unit 3 from the first white memory unit 202.

In other words, the resolution conversion unit 203 converts a single resolution of the white shading data into multiple resolutions corresponding to the multiple resolution modes of the image reading device 1 before the white shading data having the single resolution is stored in the second white memory unit 3 from the first white memory unit 202, and stores the resolution-converted white shading data in the second white memory unit 3.

For example, the image reading unit 1 includes three resolution modes of 1200 dpi, 600 dpi, and 300 dpi, and the white shading data with 1200 dpi is acquired. The white shading data with 1200 dpi is stored in the first white memory unit 202, and the resolution conversion unit 203 converts the white shading data with the resolution of 1200 dpi into the resolution resolutions of 600 dpi and 300 dpi. The resolution conversion unit 203 stores the white shading data with 1200 dpi (i.e., original white shading data), the white shading data with 600 dpi (i.e., resolution-converted white shading data), and the white shading data with 300 dpi (i.e., resolution-converted white shading data) in the second white memory unit 3.

As described above, in the image reading apparatus according to the fourth embodiment, since the white shading data having multiple resolutions corresponding to the resolution modes of the image reading device has been stored in advance, there is no need to perform a resolution conversion when the white correction unit 204 corrects the image data. As a result, the processing time can be reduced.

In an embodiment of the preset disclosure, in the image reading apparatus, the circuitry further converts a resolution of the first white shading data in the first white memory into multiple resolutions according to the number of the multiple resolution modes of the image reading device to create third white shading data having different resolutions, and stores the third white shading data having different resolutions in the second white memory.

Fifth Embodiment

In a fifth embodiment of the present disclosure, white reference shading data and white image shading data are compared. When there is a faulty pixel in the white image shading data, the faulty pixel is replaced with the white reference shading data to generate new white shading data. In the following description, the description of the same or like configuration as that of the above-described embodiment is omitted.

Figure 5:
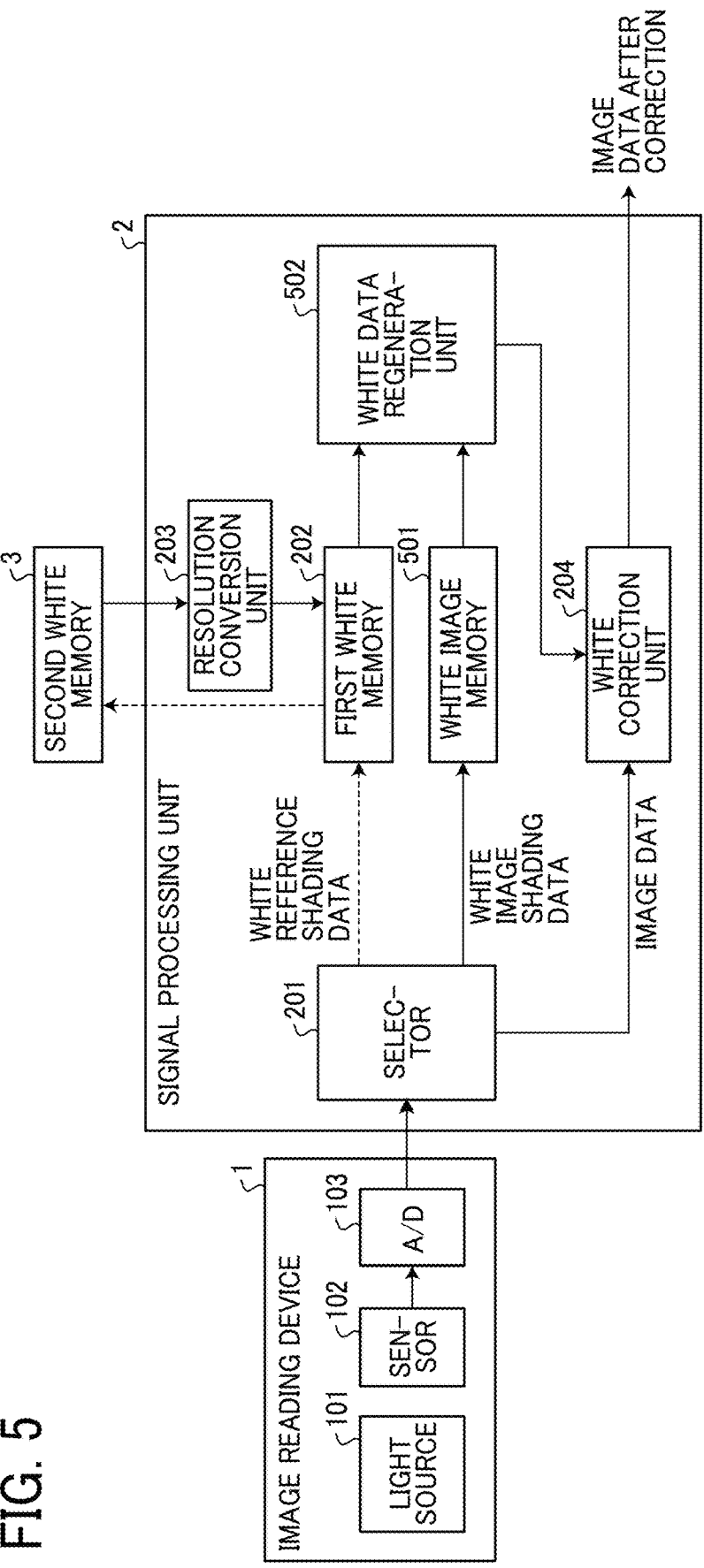
FIG. 5 is a block diagram illustrating a configuration of an image reading apparatus according to a fifth embodiment of the present disclosure.

FIG. 5 is a block diagram illustrating a configuration of an image reading apparatus according to the fifth embodiment of the present disclosure. As illustrated in FIG. 5, in the image reading apparatus according to the fifth embodiment, the signal processing unit 2 further includes a white image memory unit 501 and a white data regeneration unit 502 as compared with the configuration of the first embodiment.

The white data regeneration unit 502 compares white reference shading data stored in the first memory unit 202 and white image shading data stored in the white image memory unit 501. The white reference shading data is called from the second white memory unit 3 and is the white shading data whose resolution has been converted by the resolution conversion unit 203. In other words, in the fifth embodiment, the white shading data is white reference shading data. The white data regeneration unit 502 is a block having a function that replaces a faulty pixel in the white image shading data with the white reference shading data.

The selector 201 temporarily stores the white reference shading data in the first white memory unit 202 in the case where the data input from the image reading device 1 is the white reference shading data, and temporarily stores the white image shading data in the white image memory unit 501 in the case where the data input from the image reading device 1 is the white image shading data. In other words, the selector 201 selects the white image shading data other than the white reference shading data.

The white image memory unit 501 temporarily stores the white image shading data input from the selector 201, and sends the white image shading data to the white data regeneration unit 502. In other words, the white image memory unit 501 stores the white image shading data. The white reference shading data is white shading data acquired in a process that can guarantee product quality at the time of shipment from a factory, and is stored in the second white memory unit 3 via the first white memory unit 202 in advance. The white image shading data is white shading data to be acquired when the product quality cannot be guaranteed, which is different from a process that can guarantee the product quality at the time of shipment from a factory, and is temporarily stored the white image memory unit 501.

The resolution conversion unit 203 converts a resolution of the white reference shading data stored in the second white memory unit 3 into the same resolution of the white image shading data stored in the white image memory unit 501 (i.e., resolution-converted white image data), and stores the resolution-converted white image shading data in the first white memory unit 202.

The white data regeneration unit 502 compares the white reference shading data called from the second white memory unit 3, converted by the resolution conversion unit 203, and stored in the first white memory unit 202 and the white image shading data stored in the white image memory unit 501. For example, when the white image shading data includes a faulty pixel, the white data regeneration unit 502 replaces the faulty pixel with the white reference shading data and generates new white shading data (i.e., newly-generated white shading data). The white data regeneration unit 502 sends the newly-generated white shading data to the white correction unit 204.

For example, the signal processing unit 2 acquires white shading data from the image reading device 1 in a process that can guarantee a product quality at a time of shipment from a factory, and stores the acquired white shading data as the white reference shading data in the second white memory unit 3 including a nonvolatile memory. As in the configuration according to the first embodiment, the resolution mode of the white shading data in the main scanning direction to be stored in the second white memory unit 3 may be a single resolution mode or multiple resolution modes as long as the number of resolution modes of the white shading data is smaller than the number of resolution modes that the image reading unit 1 has.

For example, the image reading device 1 has three resolution modes of 1200 dpi, 600 dpi, and 300 dpi, and the resolution mode of the white shading data to be stored in the second white memory unit 3 may be a single resolution mode of 1200 dpi, or two resolution modes of 1200 dpi and 300 dpi. After the image reading apparatus is put on the market, the white shading data to be actually used for image correction is acquired with the same resolution as the resolution of image data when an image is read as white image shading data, and is temporarily stored in the white image memory unit 501.

Before the image data is corrected at the white correction unit 204, the white data regeneration unit 502 compares the white image shading data stored in the white image memory unit 501 and the white reference shading data whose resolution has been converted into the resolution of the image data and that is called from the second white memory unit 3. When a faulty pixel is found at a position in the white image shading data due to the influence of dust or dirt, the white data regeneration unit 502 replaces the faulty pixel at the position with the reference white shading data, and regenerates new white shading data. The white correction unit 204 corrects the image data using the newly-generated white shading data. As described above, in the image reading apparatus according to the fifth embodiment, the white shading data used in the correction can remove the faulty data caused by dust or foreign matter while following the aging of the system of the image reading apparatus, and thus the corrected image data with a high quality can be provided.

In an embodiment of the preset disclosure, the image reading apparatus further includes a white image memory to store white image shading data acquired by the image reading device, the circuitry further sets the first white shading data stored in the second white memory as white reference shading data, stores the white image shading data in the white image memory, converts a resolution of the white reference shading data into a same resolution as a resolution of the white image shading data stored in the white image memory, compares the white reference shading data stored in the first white memory and the white image shading data stored in the white image memory, and replaces a faulty pixel of the white image shading data by the white reference shading data to generate a new white shading data.

Sixth Embodiment

In a sixth embodiment of the present disclosure, the image reading apparatus further includes a second resolution conversion unit that converts the resolution of white image shading data stored in a white image memory unit into a required resolution, and the white image memory unit stores the white image shading data with resolutions in the main scanning direction. The number of resolutions of the white image shading data is smaller than the number of resolution modes of the image reading device. In the following description, the description of the same or like configuration as that of the above-described embodiment is omitted.

Figure 6:
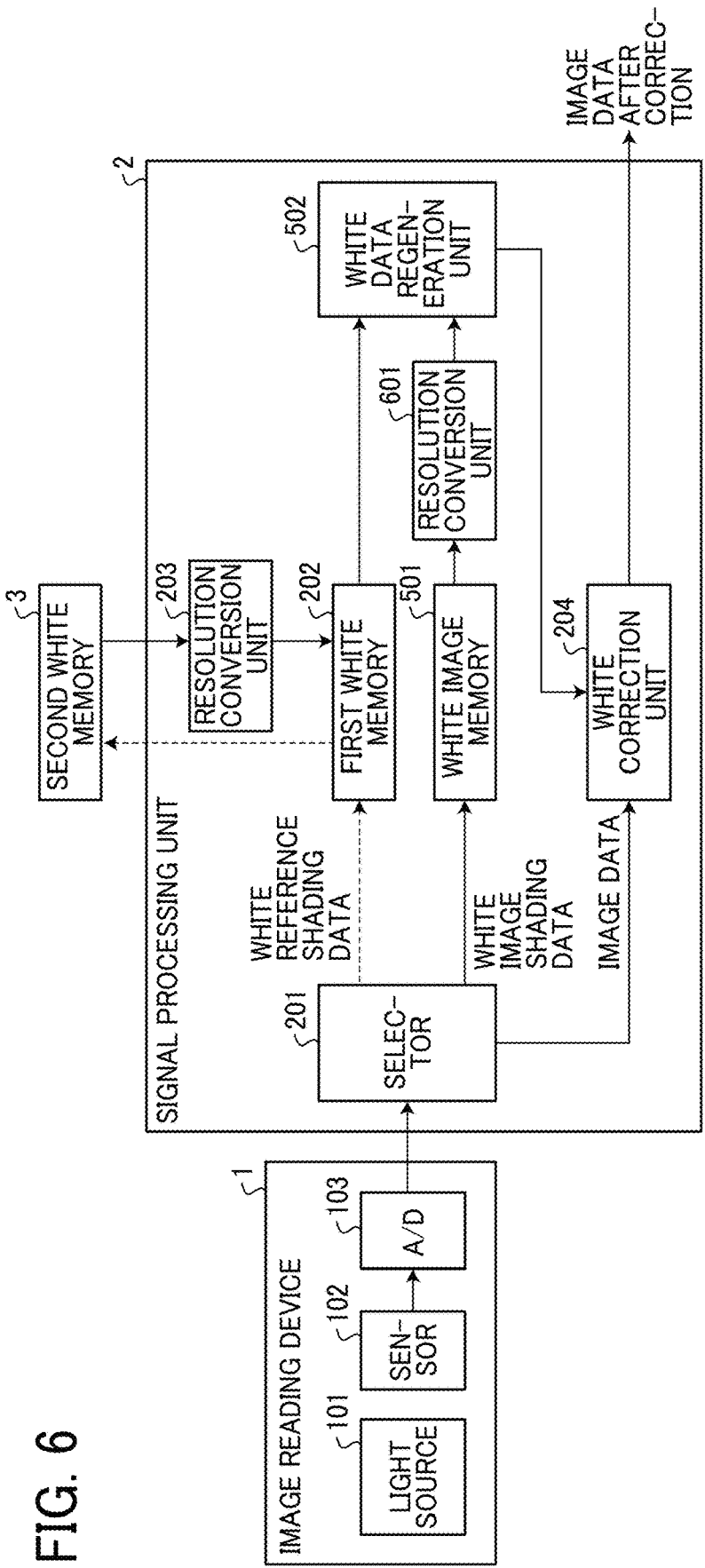
FIG. 6 is a block diagram illustrating a configuration of an image reading apparatus according to a sixth embodiment of the present disclosure.

FIG. 6 is a block diagram illustrating a configuration of an image reading apparatus according to a sixth embodiment of the present disclosure. As illustrated in FIG. 6, in the image reading apparatus according to the sixth embodiment, the signal processing unit 2 further includes a resolution conversion unit 601 as compared with the configuration of the fifth embodiment. The resolution conversion unit 601 is additionally disposed between the white image memory unit 501 and the white data regeneration unit 502.

In the image reading apparatus according to the fifth embodiment, the white image shading data is acquired with the same resolution as the resolution of image data when an image is read. However, in the sixth embodiment, the white image shading data is acquired after the power of the image reading apparatus is turned on, and is stored in the white image memory unit 501. The resolution conversion unit 601 performs resolution conversion to the white image shading data called from the white image memory unit 501 so that the resolution of the image data and the resolution of the white image shading data are the same when the white data regeneration unit 502 regenerates the white shading data. In other words, the resolution conversion unit 601 is an example of a second resolution conversion unit that converts the resolution of the white image shading data stored in the white image memory unit 501 into a required resolution. The required resolution may be a resolution of the image data acquired by reading the original document with the image reading device 1.

At this time, the resolution modes of the white image shading data in the main scanning direction stored in the white image memory unit 501 may be a single resolution mode or multiple resolution modes as long as the number of resolution modes is smaller than the number of the resolution modes that the image reading device 1 has. In other words, the white image memory unit 501 stores the white image shading data for a smaller number of resolution modes in the main scanning direction than the number of resolution modes that the image reading device 1 has.

For example, the image reading device 1 includes three resolution modes of 1200 dpi, 600 dpi, and 300 dpi, and the white shading data with 1200 dpi is stored in the second white memory unit 3 as in the fifth embodiment. At this time, the white shading data with 1200 dpi and the white shading data with 300 dpi may be stored in the second white memory unit 3. After the image reading apparatus is put on the market, the white shading data that is actually used for image correction is the white shading data with 600 dpi and stored as the white image shading data in the white image memory unit 501 when the power supply is turned on. At this time, the white shading data with 1200 dpi and the white shading data with 300 dpi may be stored. When the resolution conversion unit 601 regenerates the white shading data at a time of image reading, the resolution conversion unit 601 performs resolution conversion to the white image shading data stored in the white image memory unit 501 so that the resolution of the white image shading data and the resolution of the image data are the same, and stores the resolution-converted white shading data in the white data regeneration unit 502.

As described above, in the image reading apparatus according to the sixth embodiment, there is no need to acquire the white image shading data at each time when the resolution is changed. As a result, the image reading time can be reduced as compared with the fifth embodiment.

In an embodiment of the preset disclosure, in the image reading apparatus, the circuitry further converts a resolution of the white image shading data stored in the white image memory into another resolution, and stores the white image shading data, having a number of resolution modes smaller than the number of the multiple resolution modes of the image reading device, in the white image memory.

Aspects of the present disclosure are as follows, for example.

First Aspect

An image reading apparatus includes an image reading device having multiple resolution modes, to acquire image data with a resolution mode of the multiple resolution modes, circuitry including a first white memory unit, and a second white memory unit of a nonvolatile memory. The circuitry determines whether the image data is white shading data as a reference or read image data obtained by reading an original document, temporarily stores the white shading data in the first white memory unit with the number of resolution modes smaller than the number of the multiple resolution modes of the image reading device, stores the white shading data stored in the first white memory unit in the second white memory unit, performs a resolution conversion of the white shading data stored in the second white memory unit depending on a resolution of the image data to store the white shading data as resolution-converted white shading data in the first white memory unit, and corrects image data using the resolution-converted white shading data.

Second Aspect

In the image reading apparatus according to the first aspect, the white shading data stored in the second white memory unit includes a maximum resolution mode among the multiple resolution modes.

Third Aspect

In the image reading apparatus according to the first aspect, the white shading data stored in the second white memory unit includes a minimum resolution mode among the multiple resolution modes.

Fourth Aspect

In the image reading apparatus according to the first aspect, the circuitry performs multiple resolution conversions to the white shading data depending on the number of the multiple resolution modes of the image reading device to generate multiple resolution-converted white data between the first white memory unit and the second white memory unit, and stores the multiple resolution-converted white data in the second memory.

Fifth Aspect

In the image reading apparatus according to the first aspect, the image reading device acquires white image shading data, the circuitry further includes a white image memory unit and sets the white shading data as white reference shading data, stores the white image shading data in the white image memory unit, converts a resolution of the white reference shading data stored in the second white memory unit into a same resolution of the white image shading data stored in the white image memory unit, compares the white reference shading data stored in the first white memory unit and the white image shading data stored in the white image memory unit, and replaces a faulty pixel of the white image shading data by the white reference shading data to generate a new white shading data.

Six Aspect

In the image reading apparatus according to the fifth aspect, the circuitry converts a resolution of the white image shading data stored in the white image memory unit into another resolution, the white image memory unit stores the white image shading data with the number of resolution modes smaller than the number of resolution mode of the multiple resolution modes of the image reading device.

Seventh Aspect

An image reading apparatus includes a first white memory, a second white memory, an image reading device to acquire an image data with a resolution mode, circuitry to process signals of the image data, determine whether the image data is one of first white shading data as a reference, the first white shading data or the image data acquired from an original document read by the image reading device, temporarily store the first white shading data in the first white memory, stores the first white shading data stored in the first white memory in the second white memory, converts a resolution of the first white shading data stored in the second white memory according to a resolution of the image data to create second white shading data, stores the second white shading data in the first white memory, and correct the image data by the second white shading data.

Eighth Aspect

In the image reading apparatus according to the seventh aspect, the circuitry further stores the first white shading data, having a maximum resolution mode among the multiple resolution modes, in the second white memory.

Ninth Aspect

In the image reading apparatus according to the seventh aspect, the circuitry further stores the first white shading data, having a minimum resolution mode among the multiple resolution modes, in the second white memory.

Tenth Aspect

In the image reading apparatus according to the seventh aspect, the circuitry further converts a resolution of the first white shading data in the first white memory into multiple resolutions according to the number of the multiple resolution modes of the image reading device to create third white shading data having different resolutions, and stores the third white shading data having different resolutions in the second white memory.

Eleventh Aspect

The image reading apparatus according to the seventh aspect further includes a white image memory to store white image shading data acquired by the image reading device, the circuitry further sets the first white shading data stored in the second white memory as white reference shading data, stores the white image shading data in the white image memory, converts a resolution of the white reference shading data into a same resolution as a resolution of the white image shading data stored in the white image memory, compares the white reference shading data stored in the first white memory and the white image shading data stored in the white image memory, and replaces a faulty pixel of the white image shading data by the white reference shading data to generate a new white shading data.

Twelfth Aspect

In the image reading apparatus according to the eleventh aspect, the circuitry further converts a resolution of the white image shading data stored in the white image memory into another resolution, and stores the white image shading data, having a number of resolution modes smaller than the number of the multiple resolution modes of the image reading device, in the white image memory.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The functionality of the elements disclosed herein may be implemented using circuitry or processing circuitry which includes general purpose processors, special purpose processors, integrated circuits, ASICs ("Application Specific Integrated Circuits"), FPGAs ("Field-Programmable Gate Arrays"), and/or combinations thereof which are configured or programmed, using one or more programs stored in one or more memories, to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein which is programmed or configured to carry out the recited functionality.

There is a memory that stores a computer program which includes computer instructions. These computer instructions provide the logic and routines that enable the hardware (e.g., processing circuitry or circuitry) to perform the method disclosed herein. This computer program can be implemented in known formats as a computer-readable storage medium, a computer program product, a memory device, a record medium such as a CD-ROM or DVD, and/or the memory of a FPGA or ASIC.

The invention claimed is:

1. An image reading apparatus comprising:

a first white memory;

a second white memory including a nonvolatile memory;

an image reading device having multiple resolution modes to acquire an image data with a resolution mode of one of the multiple resolution modes;

circuitry configured to:

process signals of the image data;

determine whether the image data is one of:

first white shading data as a reference, the first white shading data having a number of resolution modes smaller than a number of the multiple resolution modes of the image reading device; or the image data acquired from an original document read by the image reading device;

temporarily store the first white shading data in the first white memory;

store the first white shading data stored in the first white memory in the second white memory;

convert a resolution of the first white shading data stored in the second white memory according to a resolution of the image data to create second white shading data;

store the second white shading data in the first white memory; and correct the image data by the second white shading data.

2. The image reading apparatus according to claim 1, wherein the circuitry is further configured to store the first white shading data, having a maximum resolution mode among the multiple resolution modes, in the second white memory.

3. The image reading apparatus according to claim 1, wherein the circuitry is further configured to store the first white shading data, having a minimum resolution mode among the multiple resolution modes, in the second white memory.

4. The image reading apparatus according to claim 1, wherein the circuitry is further configured to:

convert a resolution of the first white shading data in the first white memory into multiple resolutions according to the number of the multiple resolution modes of the image reading device to create third white shading data having different resolutions; and store the third white shading data having different resolutions in the second white memory.

5. The image reading apparatus according to claim 1, further comprising:

a white image memory to store white image shading data acquired by the image reading device;

the circuitry is further configured to:

set the first white shading data stored in the second white memory as white reference shading data;

store the white image shading data in the white image memory;

convert a resolution of the white reference shading data into a same resolution as a resolution of the white image shading data stored in the white image memory;

compare the white reference shading data stored in the first white memory and the white image shading data stored in the white image memory; and replace a faulty pixel of the white image shading data by the white reference shading data to generate a new white shading data.

6. The image reading apparatus according to claim 5, wherein the circuitry is further configured to:

convert a resolution of the white image shading data stored in the white image memory into another resolution; and store the white image shading data, having a number of resolution modes smaller than the number of the multiple resolution modes of the image reading device, in the white image memory.

* * * * *